July 24, 1923.
W. WINGROVE
VEGETABLE FEEDER FOR POULTRY
Filed Feb. 19, 1923
1,462,893
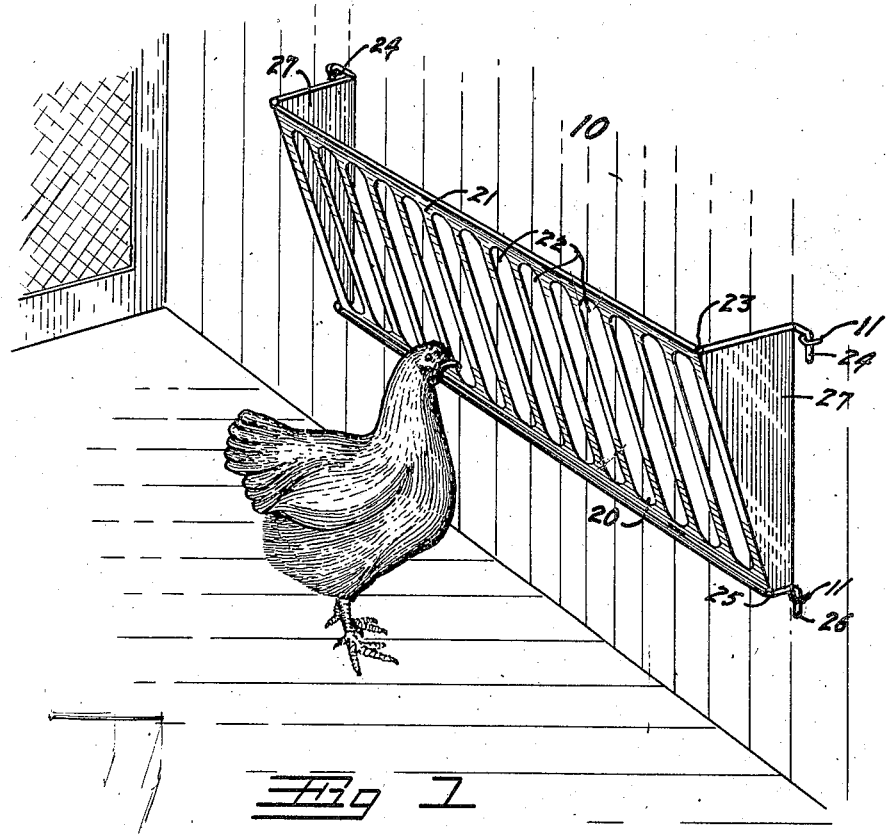
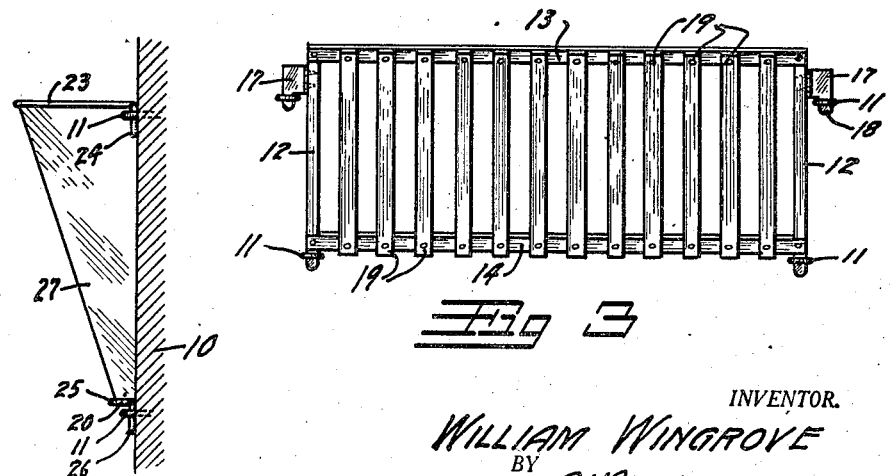
INVENTOR.
WILLIAM WINGROVE
BY
ATTORNEY.

Patented July 24, 1923.

1,462,893

UNITED STATES PATENT OFFICE.

WILLIAM WINGROVE, OF EDGEWATER, COLORADO.

VEGETABLE FEEDER FOR POULTRY.

Application filed February 19, 1923. Serial No. 620,069.

*To all whom it may concern:*

Be it known that I, WILLIAM WINGROVE, a subject of the King of England, residing at Edgewater, in the county of Jefferson and State of Colorado, have invented certain new and useful Improvements in Vegetable Feeders for Poultry, of which the following is a specification.

The usual method of feeding vegetables or roots to poultry is to throw them upon the floor of the coop or place them in a pan or other container on the floor; these methods are very unsanitary since the natural moisture of the vegetables causes them to collect and hold the floor dirt thereby making it impossible for the fowl to eat any portion of the vegetable without at the same time eating the dirt which has collected on the surface thereof.

This invention relates to a vegetable or root feeder for poultry the principal object of which is to obviate the above noted unsanitary methods of feeding vegetables and the like.

Another object of the invention is to provide a vegetable feeder which can be cheaply manufactured and which can be readily removed from the poultry enclosure for cleaning by simply lifting it from its supports.

A further object is to provide a feeder of this type which will be suspended above the floor of the poultry enclosure so as to occupy none of the floor space and be unaffected by unsanitary floor conditions.

A still further object is to so construct the feeder that the vegetables will be firmly held therein, regardless of their size, until they have been eaten down to the last bite.

A still further object is to construct a feeder which will not provide a roosting place for the poultry and which will have no horizontal plane surfaces to collect dirt.

Other objects and advantages reside in the detail construction of the improved feeder and will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view showing the improved vegetable feeder as it appears in use the feed being omitted.

Fig. 2 is an end elevation of the feeder.

Fig. 3 is a front elevation of an alternate form of the invention, constructed of wood.

Let the numeral 10 designate a wall or partition of the poultry enclosure in which is fixed, at predetermined positions, four staples 11.

The alternate form of feeder consists of two wedge shaped end members 12 connected together at the top and bottom, respectively, by horizontal members 13 and 14, which are inset in one edge of each of the end members 12 as shown at 15.

The diminished extremities of the end members 12 are placed downward and terminate in tongues 16, each of which is adapted to engage in one of the staples 11.

An angle clip 17 is secured to the outer face of each of the end members 12, near the upper edge thereof, said clips being provided with tongues 18 which engage in two of the staples 11.

Connecting the horizontal members 13 and 14, are a series of spaced slats 19.

It will be noted that when either of the forms of the feeder are in position on the wall 10, there is a space or opening 20 left between the lower edge of the feeder front and the wall 10. This opening 20 allows the remains of the vegetables or any dirt which may be caught in the feeder to fall to the floor. It will also be noted that the edges of the horizontal members 13 and 14, in the alternate form are at an angle from the horizontal, as are the upper ends of the slats 19; this prevents dirt, etc. from accumulating on these surfaces and raises the sanitary standard of the invention.

The width of the members 12 at their upper edges is relatively narrow so as to prevent fowls from being able to stand and roost upon the feeder and contaminating the contents.

In use, the lower two of the staples 11 are placed about 12 inches from the floor, so as to keep the feeder away from the unsanitary floor conditions and to allow the poultry enclosure to be swept and cleaned without it being necessary to disturb the feeders. The vegetables, roots or other similar food is placed in the open top of the feeder and moves down in the wedge shaped opening between the slats 19 and the wall 10 until it is firmly wedged; as the food is eaten and becomes small it moves further down in the feeder, always however being held firmly by the wedge shape of the feeder so as to facilitate its being eaten by the poultry, until finally the small remaining portions fall through the opening 20. The operation of the feeder is automatically continuous since fresh food can constantly be added at the top as the partially consumed food moves downward.

The preferred form of the feeder, shown in Figs. 1 and 2, consists of a single strip of sheet metal 21, in which transverse slots 22 are formed, the extremities of the strip being bent back to form wedge shaped end members 27 similar to end members 12 of the alternate form. The upper edge of the strip 21 is turned over a rod 23 which terminates at its extremities in downward projecting hooks 24, which engage in the upper two of the staples 11. The lower edge of the strip 21 is turned over as similar rod 25 which also terminates in downward projecting hooks 26, which engage in the lower two of the staples 11.

When it is desired to clean the feeders or spray or paint the poultry enclosures, the feeders can be instantly removed, without the use of tools, by simply lifting them from the supporting staples 11. The invention has been described and illustrated as a poultry feeder but the principles of the construction would also be valuable in other applications such as for feeding certain classes of food to live stock, etc.

While the applicant has described and illustrated herein a specific form of his improvement, it is desired to be understood that the same may be varied, within the scope of the appended claims, without departing from the spirit of the invention.

Having thus described the invention, what is claimed and desired secured by Letters Patent is:

A feed container for poultry comprising a strip of sheet metal bent at its extremities to form two wedge shaped end members; a series of slots formed in said strip between said end members; a rod secured along the upper edge of said strip, said rod terminating at its ends in downward turned hooks; a second rod secured along the lower edge of said strip with its ends similarly terminated and staples adapted to be fixed in a vertical wall and engaged by said downward turned hooks.

In testimony whereof I affix my signature.

WILLIAM WINGROVE.